(12) United States Patent
Richter et al.

(10) Patent No.: US 8,474,106 B2
(45) Date of Patent: Jul. 2, 2013

(54) SEAT BELT LATCH PLATE ASSEMBLY

(75) Inventors: Steven J. Richter, St. Clair Shores, MI (US); George J. Strnad, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 247 days.

(21) Appl. No.: 13/020,832

(22) Filed: Feb. 4, 2011

(65) Prior Publication Data

US 2012/0198660 A1   Aug. 9, 2012

(51) Int. Cl.
*A44B 11/10*   (2006.01)
*A44B 11/26*   (2006.01)

(52) U.S. Cl.
USPC ............ 24/265 BC; 24/196; 24/170; 24/171; 297/483

(58) Field of Classification Search
None
See application file for complete search history.

(56) References Cited

U.S. PATENT DOCUMENTS

| 3,941,419 | A |   | 3/1976  | Blom |
| 3,974,546 | A |   | 8/1976  | Walker |
| 4,893,874 | A |   | 1/1990  | Childress |
| 5,023,980 | A |   | 6/1991  | Thomas |
| 5,050,274 | A |   | 9/1991  | Staniszewski |
| 5,058,244 | A | * | 10/1991 | Fernandez ............... 24/170 |
| 6,837,519 | B2 |   | 1/2005  | Moskalik |
| 7,325,280 | B2 | * | 2/2008  | Ichida .................... 24/170 |
| 7,712,194 | B2 |   | 5/2010  | Fyhr |

\* cited by examiner

*Primary Examiner* — Jack W. Lavinder

(57) ABSTRACT

A seat belt has an upper end mounted at the occupant shoulder and a lower end mounted adjacent the occupant lap. A latch plate assembly carried by the belt engages a buckle. The latch plate assembly includes a housing having a pair of flanges and a depression extending laterally between the flanges. A lock bar pivotally mounted on the flanges has a clamping surface moving toward and away from the depression upon pivoting movement of the lock bar. The belt wraps around the lock bar so that a force applied to the belt pivots the lock bar and the clamping surface of the lock bar clamps the belt into the depression to lock the belt against movement through the latch plate assembly. The lock bar pivot axis is closer to the clamping surface than the opposite side edge around which the belt wraps to increase the clamping force.

8 Claims, 2 Drawing Sheets

US 8,474,106 B2

SEAT BELT LATCH PLATE ASSEMBLY

FIELD OF THE INVENTION

The present invention relates to a latch plate assembly that slides on the seat belt and clamps the seat belt against transference through the latch plate assembly when an occupant restraining load is imposed on the seat belt.

BACKGROUND OF THE INVENTION

It is known in vehicle seat belt systems to employ a continuous loop of belt having a latch plate assembly slidable along the belt to adjust the relative restraint lengths of the lap and shoulder belt portions. It is also known to provide a retractor mounting one end of the belt, preferably the shoulder belt end, to wind the continuous loop belt to a stored position extending generally vertically between an upper anchor mounting the shoulder belt end on the vehicle body and a lower anchor mounting the lap belt end on the vehicle body. The belt may be unwound from the retractor and extended across the occupant torso to engage the latch plate assembly in a buckle suitably mounted on a vehicle body inboard the occupant seat.

When the latch plate assembly is engaged in the buckle, the belt is clamped to prevent transference of the belt through the latch belt assembly.

It would be desirable to provide a new and improved latch plate assembly which would more effectively clamp the belt when restraint of the seated occupant is needed, and yet unclamp the belt for transference through the latch plate assembly when the restraint of the occupant is not needed.

SUMMARY OF THE INVENTION

A seat belt has an upper end mounted at the occupant shoulder and a lower end mounted adjacent the occupant lap. A latch plate assembly carried by the belt engages a buckle. The latch plate assembly includes a housing having a pair of flanges and a depression extending laterally between the flanges. A lock bar pivotally mounted on the flanges has a clamping surface moving toward and away from the depression upon pivoting movement of the lock bar. The belt wraps around the lock bar so that a force applied to the belt pivots the lock bar and the clamping surface of the lock bar clamps the belt into the depression to lock the belt against movement through the latch plate assembly. The lock bar pivot axis is closer to the clamping surface than the opposite side edge around which the belt wraps to increase the clamping force. The lock bar bends as force is applied to the lock bar by the belt, and the bending permits the clamping surface of the lock bar to move further into the depression and increase the clamping force on the belt. The clamping surface of the lock bar is a rounded surface and the depression of the housing is also a rounded surface so that upon clamping of the belt, the belt is clamped between the rounded surface of the lock bar and the rounded surface of the depression. A spring acts on the lock bar to pivot the lock bar to a normal position in which the clamping surface is moved away from clamping the belt into the depression so that so that the belt is allowed to freely transfer through the latch plate assembly.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
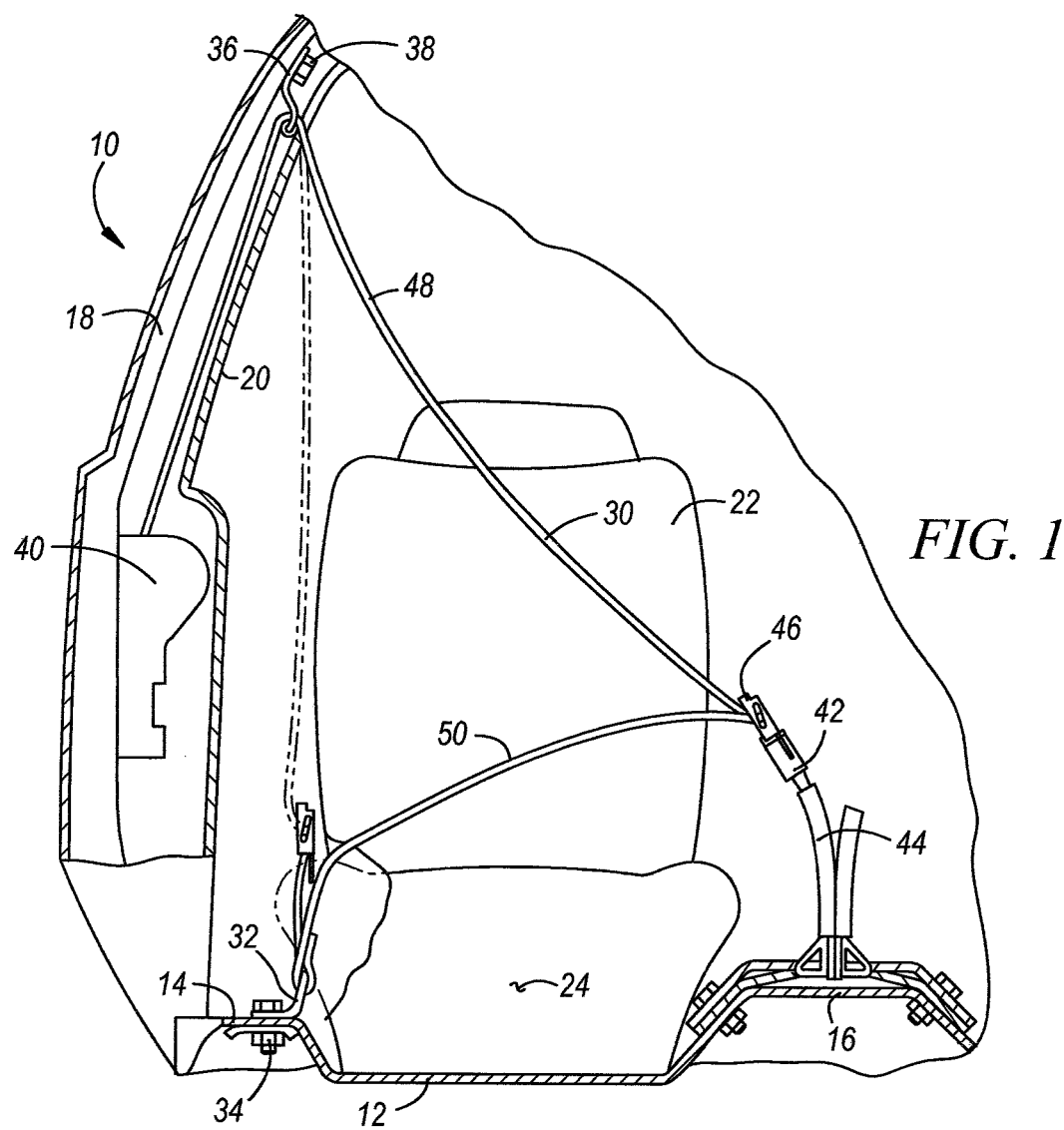
FIG. 1 is a sectional view taken through a vehicle body having an occupant restraint belt system including the latch plate assembly of this invention.

Referring to FIG. 1, a vehicle body, indicated by the numeral 10, includes a floor 12 having an outboard sill 14 and an inboard transmission tunnel 16. A pillar 18 extends vertically adjacent the rear of the seat outboard thereof and includes a trim panel 20 facing the passenger compartment of the vehicle body.

An occupant seat is mounted within the occupant compartment and includes a seat back 22 and a seat bottom 24. An occupant restraint system includes a continuous loop restraint belt 30 having a lower end attached to the sill 14 by an anchor plate 32 and a bolt assembly 34. The upper end of the continuous loop belt 30 passes through a guide loop 36 attached to the pillar 18 by a bolt 38. The continuous loop belt 30 extends downwardly to a shoulder belt retractor 40 which winds the continuous loop belt 30 to a phantom line indicated stored position extending generally vertically along the trim panel 20 between the anchor plate 32 and the guide loop 36.

A seat belt buckle 42 is mounted on the transmission tunnel 16 by a semi-rigid anchor strap 44. A latch plate assembly 46 is slidable along the continuous loop belt 30 and divides the continuous loop belt 30 into a lap belt portion 50 and a shoulder belt portion 48 when the latch plate assembly 46 is engaged within the buckle 42 as shown in FIG. 1.

Figure 2:
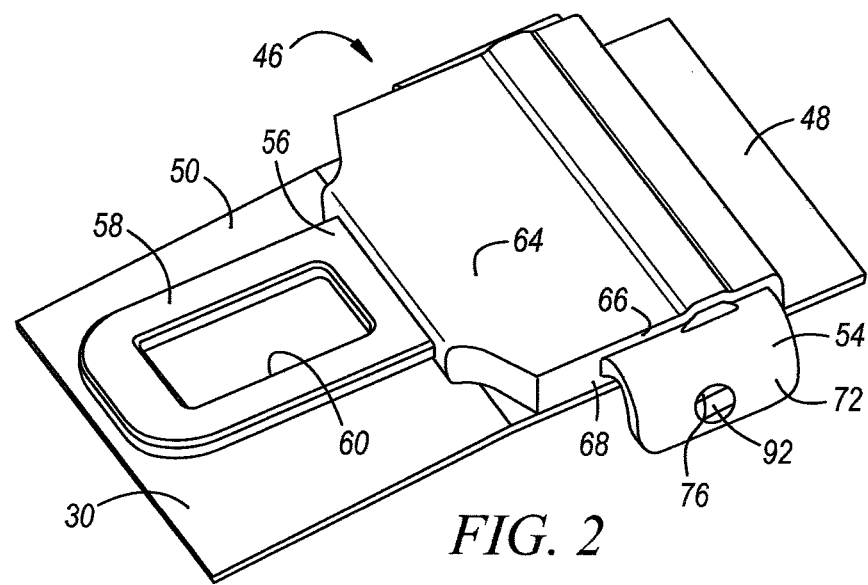
FIG. 2 is a perspective view of the latch plate assembly of this invention.
Figure 3:
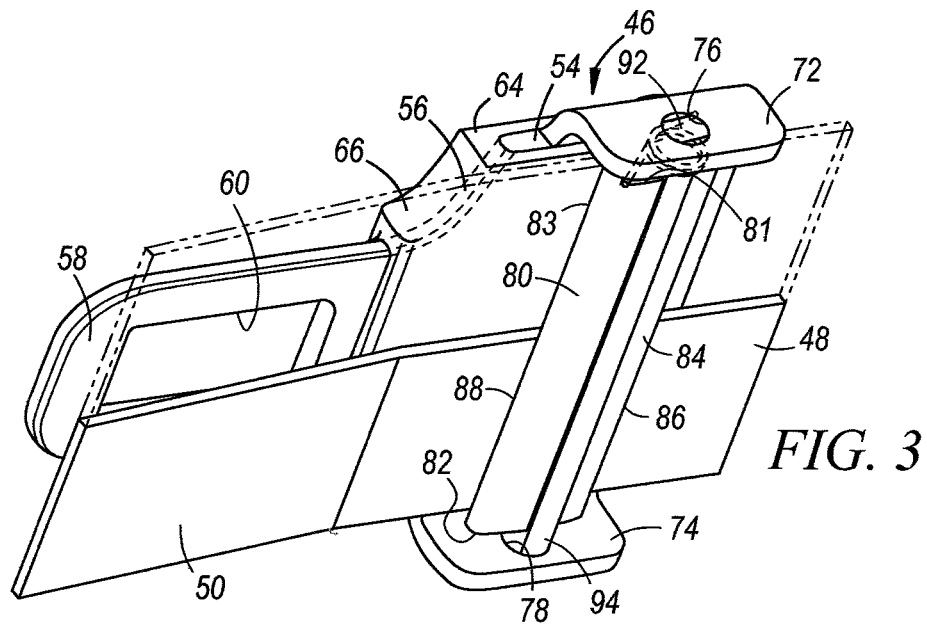
FIG. 3 is a perspective view showing the underside of the latch plate assembly.

Referring to FIGS. 2 and 3, the latch plate assembly 46 is comprised of a housing 54 that is stamped from sheet steel and includes a generally planar base wall 56 having a latch tongue 58 which is necked down to extend into the buckle 42 and has an aperture 60 for receiving the latch of the buckle 42. The planar base wall 56 is over-molded with plastic to form a cover 64 including an outer cover portion 66 that improves the aesthetics of the latch plate assembly 46, and an inner cover portion 68 that will be discussed further hereinafter.

Figure 4:
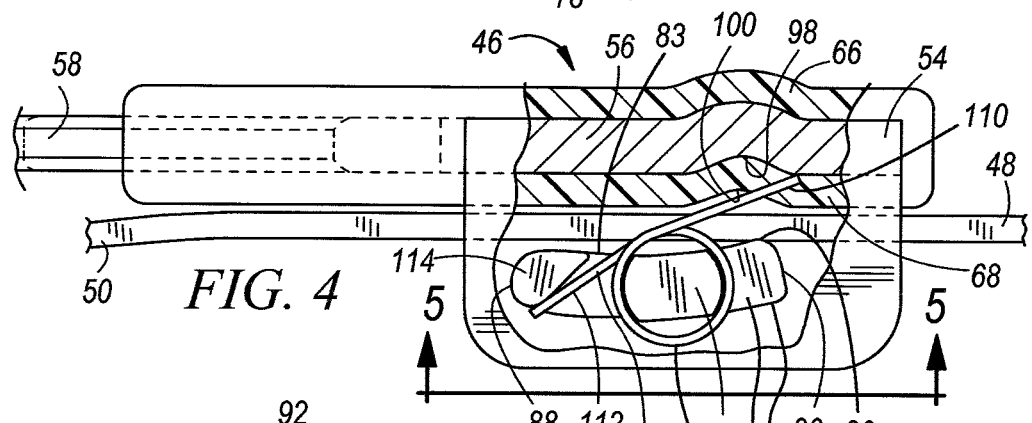
FIG. 4 is a side elevation view of the latch plate assembly showing the unbuckled position of the latch plate assembly in which the latch plate assembly is free to slide along the belt.
Figure 5:
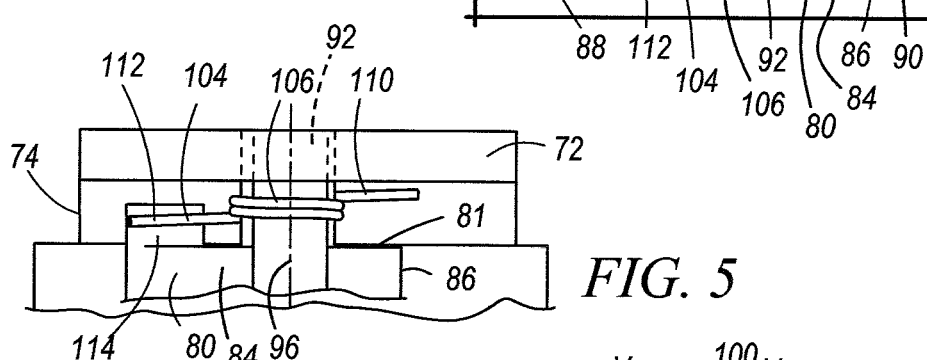
FIG. 5 is a view taken in the direction of arrows 5-5 of FIG. 4.

As seen in FIGS. 3, 4, and 5, the housing 54 also includes downturned flanges 72 and 74 that are downturned from the side edges of the housing 54 and are laterally spaced apart by a greater distance than the width of the belt 30. The downturned flanges 72 and 74 have circular openings 76 and 78 respectively provided therein. A lock bar 80 is a rectangular bar of metal having ends 81 and 82, upper surface 83, lower surface 84, and side edges 86 and 88. A rounded clamping surface 90 is provided at the intersection of the side edge 86 and the upper surface 83. The ends 81 and 82 of the lock bar 80 have round pivot pins 92 and 94 integral therewith that extend respectively into circular openings 76 and 78 so that the lock bar 80 is mounted for pivoting movement about axis 96 relative to the housing 54.

Referring to FIGS. 4 and 5, it is seen that the planar base wall 56 of the housing 54 has a depression 98 formed their in and the inner cover portion 68 has a similar depression 100. These depressions extend laterally across the housing 54 between the downturned flanges 72 and 74, and align with the lock bar 80 to receive the rounded clamping surface 90 of the lock bar 80 when the lock bar 80 is pivoted relative the housing 54, as will be discussed further hereinafter.

A spring 104 is provided for biasing the lock bar 80 to its normal unlocked position of FIG. 4. The spring 104 includes a coil 106 that encircles the pivot pin 92 of the lock bar 80. The coil 106 terminates in an anchor leaf 110 that engages the underside of the planar base wall 56 and a biasing leaf 112 that engages an abutment 114 formed on the end of the lock bar 80. Accordingly, as seen in FIG. 4, the spring 104 will position the lock bar 80 in a neutral unlocked condition where the rounded clamping surface 90 of the lock bar 80 is clear of clamping contact with the belt 30 so that the latch plate assembly 46 can slide freely up and down the belt 30.

Figure 6:
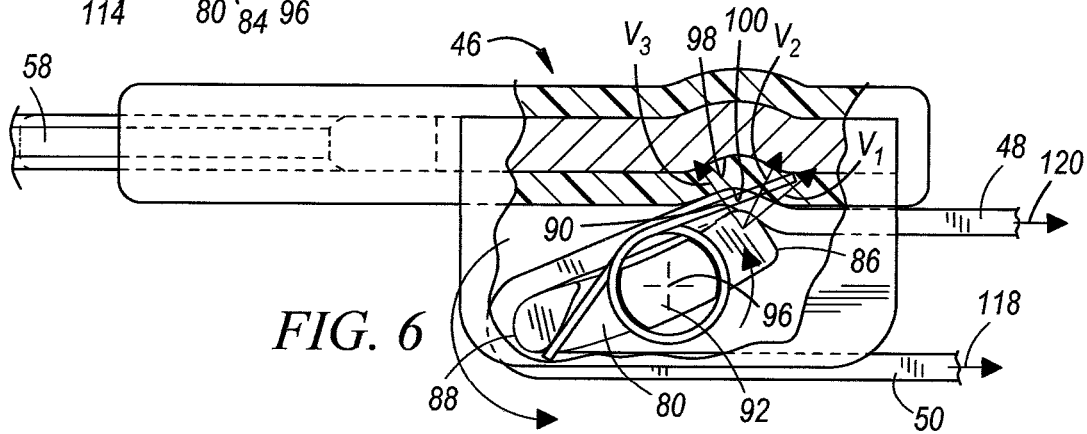
FIG. 6 is a view similar to FIG. 4 but showing the latch plate in the buckled condition and an occupant restraint load causing the lock bar to clamp the seat belt against transference of the belt through the latch plate assembly.

Referring to FIG. 6, the latch plate assembly 46 is shown at its position in which the latch tongue 58 has been engaged in the buckle 42 so that the latch plate assembly 46 has been re-orientated relative the belt 30. Thus, FIG. 6 shows that the shoulder belt portion 48 and the lap belt portion 50 are lying generally parallel with one another.

During the onset of an occupant load against the belt 30, the lap belt load is applied in the direction of arrow 118. The belt 30 wrapping around the lock bar 80 will cause the lock bar 80 to rotate counterclockwise about axis 96, as viewed in FIG. 6, so that the belt 30 is clamped between the rounded clamping surface 90 of the lock bar 80 and the depression 100 of the inner cover portion 68 of the latch plate assembly 46. Thus, the belt 30 is clamped into the depression 100 and against the inner cover portion 68 so that the transference of belt 30 is prevented in either direction through the latch plate assembly 46. During restraint of the occupant, the lap belt load is applied in the direction of arrows 118, while at the same time the shoulder belt load will be applied to the shoulder belt in the direction of arrow 120. The force applied to the shoulder belt 48 in the direction 120 will oppose the lap belt load 118 and tend to pivot the lock bar 80 away from the locked position of FIG. 6. However, as seen in FIG. 6, the lock bar 80 is designed with the side edge 88 being a further distance from the center of rotation at the axis 96 than the side edge 86. The lock bar 80 acts as a lever creating a mechanical advantage so that the force applied to the lap belt 50 in the direction of arrow 118 has a greater effect than the force applied to the shoulder belt 48 in the direction 120. This mechanical advantage will work to maintain the lock bar 80 at its locked position of FIG. 6 against the bias of the spring 104 and against the bias of the shoulder belt load in the direction 120.

As seen in FIG. 6, the rounded clamping surface 90 of the lock bar 80 and the depression 100 of the inner cover portion 68 are cooperatively shaped and located to provide effective clamping of the belt 30. In particular, as seen in FIG. 6, the rounded clamping surface 90 will force the belt 30 into the depression 100 and generally provide clamping forces over an arcuate range of contact and generally in the direction of the arrows labeled V1, V2, and V3. The rounding of the clamping surface 90 and rounding of the depression 100 also avoid clamping the belt between sharp surfaces that might abrade the belt. During the initial clamping action, the load on the belt may be greatest in the direction of arrow V3. However, during the progressive buildup of force on the shoulder belt 48 and the lap belt 50 during the restraint of an occupant, the lock bar 80 will deform under the load imposed on the lock bar side edge 88 by the force applied to the shoulder belt 48 and lap belt 50. This deformation will cause a greater clamping interaction in the direction of arrow V1 as the side edge 86 of the lock bar 80 will actually move in the direction of arrow V1 during a definite deformation. This deformation may also occur by a slight bending of the pivot pins 92 and 94, or the bending may occur along the entire length of the lock bar 80. Accordingly, the clamping effectiveness of the latch plate assembly 46 can be tuned and modified by adjusting such variables as the radius of the rounded clamping surface 90 of the lock bar 80, the rounded shape, depth and curvature of the depression 100 of the inner housing cover 68, and by tuning the deformation characteristics of the lock bar 80.

The foregoing description of FIGS. 1 through 6 is intended to provide the details of one example for carrying out the invention, and a person of ordinary skill will recognize modifications that can be made. For example, in our drawings we have shown a molded plastic cover molded onto the stamped planar base wall 56. However, the invention can be practiced without such a molded plastic cover. The depression can be provided in the stamped steel planar base wall and the lock bar 80 will clamp the belt 30 into the depression in the stamped steel planar base wall.

What is claimed is:

1. In a seat belt system with a continuous length of belt having an upper end mounted adjacent the occupant shoulder and a lower end mounted adjacent the occupant lap, and a latch plate assembly carried by the belt for engagement with a buckle, said latch plate assembly comprising:

a housing having a tongue projecting from one end thereof for latching engagement by the buckle, a pair of flanges integral with the base wall and extending perpendicularly therefrom at a lateral spacing somewhat greater than the width of the belt, and a molded plastic cover having a depression extending laterally between the flanges;

a lock bar pivotally mounted on the flanges by pivot pins extending from ends of the lock bar into openings provided in the flanges to define a pivot axis, said lock bar being a one-piece rectangular metal shape and having a clamping surface on one side edge thereof moving toward and away from the depression upon pivoting movement of the lock bar and having the belt wrapped around an opposite side edge opposite the one side edge so that a force applied to the belt pivots the lock bar and the clamping surface of the lock bar clamps the belt into the depression of the housing to lock the belt against movement through the latch plate assembly;

the lock bar having the pivot axis closer to the one side edge of the lock bar having the clamping surface and further from the opposite side to provide a mechanical advantage which increases the clamping force on the belt;

the lock bar being deformable and bending under the force applied to the opposite side edge of the lock bar, and the bending permitting the clamping surface of the lock bar to move further into the depression and increase the clamping force on the belt;

and, a spring acting on the lock bar to pivot the lock bar to a normal position in which the clamping surface is moved away from clamping the belt into the depression so that the belt is allowed to freely transfer through the latch plate assembly when a force is not applied to the lock bar.

2. The combination of claim 1 further comprising the clamping surface of the lock bar being a rounded surface and the depression of the housing being a rounded surface so that upon clamping of the belt the belt is clamped between the rounded surface of the lock bar and the rounded surface of the depression.

3. The combination of 1 further comprising the deformation occurring by a bending of the pivot pins of the lock bar.

4. The combination of claim 3 further comprising the clamping surface of the lock bar being a rounded surface and the depression of the housing being a rounded surface so that upon clamping of the belt the belt is clamped between the rounded surface of the lock bar and the rounded surface of the depression.

5. The combination of claim 1 further comprising the deformation occurring along the entire length of the lock bar.

6. The combination of claim 5 further comprising the clamping surface of the lock bar being a rounded surface and the depression of the housing being a rounded surface so that upon clamping of the belt the belt is clamped between the rounded surface of the lock bar and the rounded surface of the depression.

7. The combination of 1 further comprising the deformation occurring by both a bending of the pivot pins of the lock bar and a deformation occurring along the entire length of the lock bar.

8. The combination of claim 7 further comprising the clamping surface of the lock bar being a rounded surface and the depression of the housing being a rounded surface so that upon clamping of the belt the belt is clamped between the rounded surface of the lock bar and the rounded surface of the depression.

* * * * *